United States Patent [19]

Fields et al.

[11] 4,299,580
[45] Nov. 10, 1981

[54] EDUCATIONAL OBJECT IDENTIFICATION GAME

[76] Inventors: Johnell Fields; Jessie Holten, both of P.O. Box 5002, Oakland, Calif. 94605

[21] Appl. No.: 150,614

[22] Filed: May 16, 1980

[51] Int. Cl.³ .............................................. G09B 7/00
[52] U.S. Cl. ................................................. 434/335
[58] Field of Search ............... 434/335, 338, 340, 341, 434/342, 343, 176; 273/1 E

[56] References Cited

U.S. PATENT DOCUMENTS

| | | | |
|---|---|---|---|
| 2,062,453 | 12/1936 | Hastings | 434/342 |
| 2,184,120 | 12/1939 | Harris | 434/338 |
| 2,449,116 | 9/1948 | Hatchett | 434/176 |
| 2,720,038 | 10/1955 | Clark | 434/343 |
| 3,298,115 | 1/1967 | Dunn, Jr. | 434/335 |
| 3,477,143 | 11/1969 | Aumann | 434/340 |
| 3,660,586 | 5/1972 | Hilbert | 434/335 |
| 3,809,784 | 5/1974 | Munafo | 434/335 |

*Primary Examiner*—William H. Grieb
*Attorney, Agent, or Firm*—Bielen and Peterson

[57] ABSTRACT

A game mechanism including first and second electrically operated alarms and first and second switches for activating the same. A container for the object and a display of the symbolic equipment of the object in the container are also included. A third switch selectively activates a first or second switch in conjunction with the equivalence of the object in the container and the display of the symbolic equivalent of the same such that activation of the first and second switch occurs to reinforce a right or wrong answer as to the identity of the object by the user.

5 Claims, 2 Drawing Figures

EDUCATIONAL OBJECT IDENTIFICATION GAME

BACKGROUND OF THE INVENTION

The present invention relates to a novel educational game mechanism which may be used as a teaching aid.

Prior teaching and testing machines have included apparatuses which count right or wrong answers by a student and display a light indicating the correctness of the answer. Such a device may be found in U.S. Pat. No. 3,660,586 issued to Hilbert. Another type of teaching machine includes association of a replica of an object idenfied by the literary equivalent of the same as in U.S. Pat. No. 2,449,116 issued to Hatchett. Another type of teaching machine includes the feature of permitting the student to venture a multiple guess as to the identity of an item and the literary equivalent of the same. An example of such machines may be found in U.S. Pat. No. 2,062,453 issued to Hastings and U.S. Pat. No. 2,720,038 issued to Clark. Both of these machines operate automatically without the interaction of a teacher.

It has been found that teaching machines cannot absolutely replace a teacher and the need for a teaching machine which involves the student and the teacher simultaneously is needed.

SUMMARY OF THE INVENTION

In accordance with the present invention a novel and useful game mechanism which may be used to teach the student the association of an item with a symbolic equivalent of the same is provided.

The game mechanism of the present invention employs first and second electrically operated alarm means for producing first and second signals. Such signals may be visual, audible, or of any other genre which may be detected by the sensory receptors of a living being.

The device may also include a structural member for mounting the first and second alarm means and a fanciful display for exciting and maintaining the interest of the student, particularly those of a young age. The mechanism also includes means for containing an object which may take the form of a container having a closeable opening at the display surface and means for displaying the symbolic equivalent of the object. Such symbolic equivalent may be in the form of a writing, in any language or other system of communication, e.g. shorthand.

First and second switch means are used for activating the first and second alarm means and are electrically connected to the same. A source of electrical power motivates the circuit formed by the alarm means and switch means heretofore described. Third switch means is also provided for selectively activating the first or second means and is electrically connected to the same. The third switch means may be operable by the teacher in conjunction with the object, which is the subject of identification by the student. The first and second switch means may be combined into a single switch such that the student will instantly realize the correctness of his answer upon the activation of this single switch.

The game mechanism may embrace the provision that the first electrically operated alarm means include a visual and audio alarm operable at different voltage levels. In accordance with this feature, and where the power source is an alternating current source, transformer means is provided such that a single electrical power source may be used, i.e. commonly available 110 volt alternating current.

The game mechanism of the present invention may be constructed in a relatively compact manner and provide for remote operation of said third switch means by the teacher outside the observation of the student.

It may be apparent that a novel and useful game mechanism has been provided by the heretofore summary.

It is therefore an object of the present invention to provide a game mechanism which may be operated by a commonly available home or school power source.

It is another object of the present invention to provide a game mechanism which aids a teacher in the teaching of students of literary equivalence of certain objects and combines the teaching activity with an atmosphere of game playing.

It is yet another object of the present invention to provide a game mechanism which communicates to the student the rightness or wrongness of his answer with a single motion by the student.

It is yet another object of the present invention to provide a game mechanism which includes audio and visual alarms which are operated at different electrical voltage levels.

The game mechanism includes other objects and advantages especially as concerns particular characteristics and features thereof which will be apparent as the specification continues.

For a better understanding of the invention, reference is made to the following detailed description.

DESCRIPTION OF THE PREFERRED EMBODIMENTS

Various aspects of the present invention will evolve from the following detailed description of the preferred embodiments, which should be taken in conjunction with the heretofore described drawings.

Figure 1:
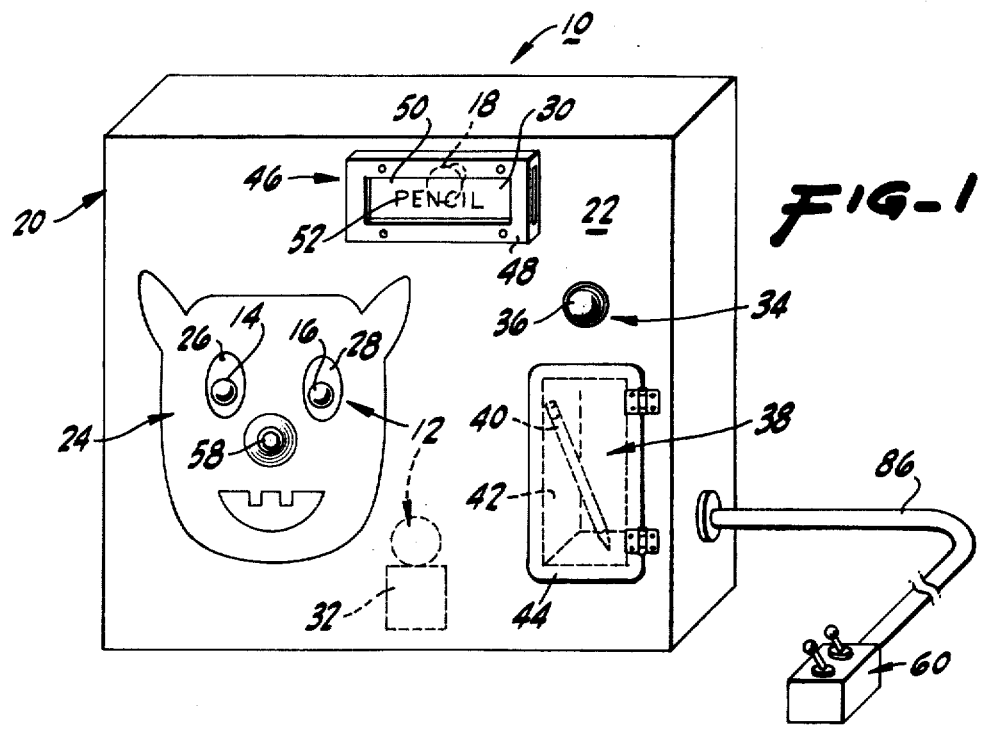
FIG. 1 is an isometric view of the game mechanism having a slightly broken portion.
Figure 2:
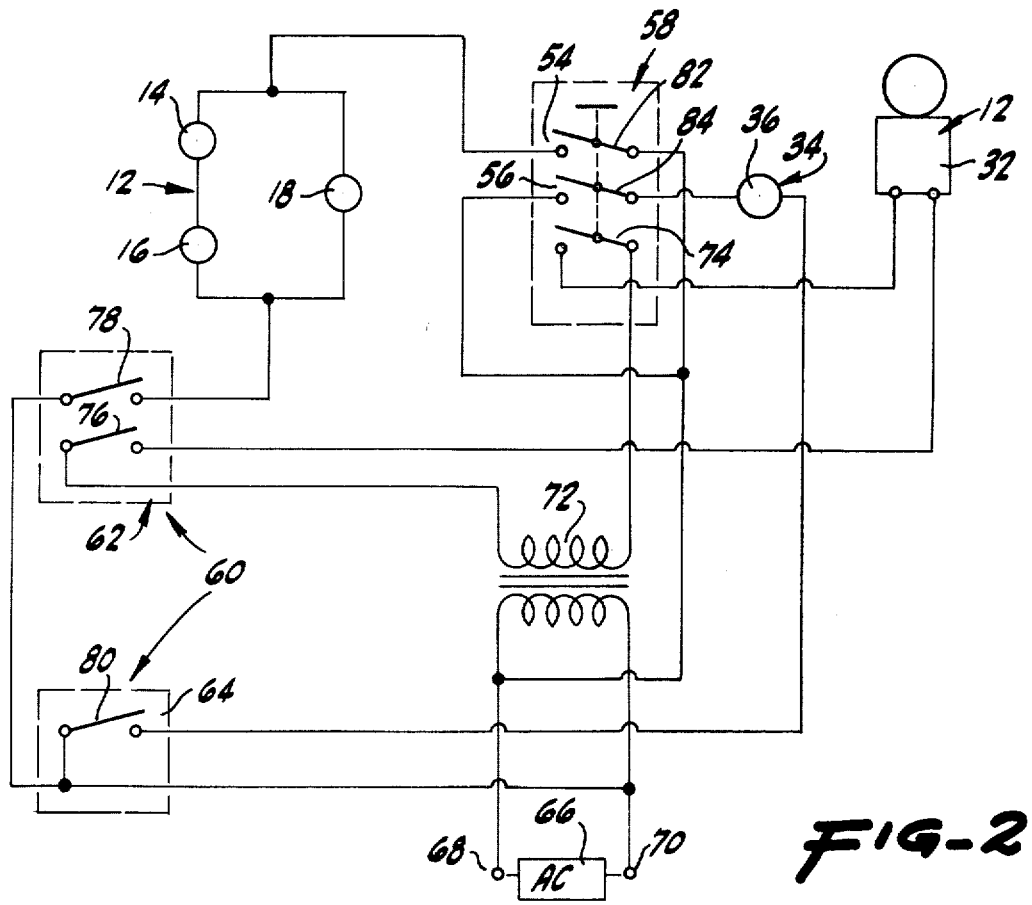
FIG. 2 is a schematic drawing of the electrical circuitry of the game mechanism of the present invention.

The invention as a whole is depicted in the drawings by reference character 10 and includes as one of its elements first electrically operated alarm means 12, FIGS. 1 and 2. First alarm means may include light bulbs 14, 16, and 18 which may be mounted on structural member 20 shown in FIG. 1 as having a rectangular solid configuration. Structural member 20 includes a display surface 22 which is visible to the student using the machine. In this regard, display surface icludes a fanciful figure 24 having translucent portions 26, 28, and 30 for permitting the passage of light from bulbs 14, 16, and 18. First alarm means may also include a bell 32 which is mounted within structure 20 behind display surface 22, shown in phantom on FIG. 1. Second alarm means 34 is also included and takes the form of a light bulb 36 mounted for visual observation in the vicinity of display surface 22. The electrical operation of light bulbs 14, 16, 18, and 36 and bell 32 will be described hereinafter.

Structural member 20 also provides for means 38 for containing an object, shown in FIG. 1 as a pencial 40. Means 38 may take the form of a box 42 recessed from surface 22 of structural member 20. A door 44 may be provided for concealing pencil 40 when it is within box 42. The mechanism of the present invention also contains means 46 for displaying the symbolic equivalent of the object 40 contained within box 42. Means 46 may take the form of a slotted container 48 mounted on surface 22 of structural member 20. A placard such as placard 50 may be placed within slotted container 48 for display of indicia contained thereon. Such indicia 52 may be in any language or communication system which is to be taught to the student in association with the object 40.

First switch means 54 and second switch means 56, FIG. 2, activate first and second alarm means 12 and 34 respectively. The preferred embodiment shows first switch means as a single push-button switch 58 having multiple throw capabilities. The mechanism also contains third switch means 60, FIGS. 1 and 2, for selectively activating first or second switch means 54 and 56.

With reference to FIG. 2 which details in schematic form the electrical arrangement of mechanism 10, it may be seen that third switch means 60 includes switch 62 and switch 64. Switch 62 is a double throw switch while switch 64 is a single throw switch. An AC power source 66 connects to terminals 68 and 70 and flows to transformer 72. From transformer 72 contact is made to arm 74 of switch 58, and from there to bell 32. Bell 32 connects to arm 76 of switch 62 to complete a subcircuit. Likewise, the power source 66 feeds switch 62 and switch 64, specifically to arms 78 and 80 thereof. The closing of arm 78 permits electrical current to flow through bulbs 14, 16, and 18, and hence to switch 58. The closing of arm 82 of switch 58 completes a subcircuit which powers first alarm means 12. Light bulb, or lamp 36 is electrically connected to arm 80 of switch 64 and to arm 84 of switch 58. Arm 84 when closed returns to AC power sorce 66 to complete another subcircuit. Thus, when switch 64 is closed, the activation of switch 58 will light lamp 36. Likewise, the closing of arms 76 and 78 of switch 62 will light first alarm means 12 including light bulbs 14, 16, and 18 and bell 32.

In operation, the user activates AC power source 66 and opens first, second, and third switch means 54, 56, and 60, namely switches 58, 62, and 64. The teacher using the mechanism 10 selects an object, such as pencil 40 and permits the students to closely observe the same. A placard 50 is inserted in container 58 to either correspond to the object or not correspond to the object as the case may be. If the placard 50 corresponds to object 40, switch 62 is activated such that arms 76 and 78 are thrown to make contact and complete the circuit within switch 62. A student will then be asked whether or not the placard indicia 52 describes object 40. The child activates switch 58 by pressing the nose of fanciful figure 24 which will activate first alarm means 12 heretofore described. If placard 50 did not match object 42 the teacher would have thrown switch 64 instead of switch 62. In such a case the activation of switch 58 would light lamp 36 and indicate a wrong answer. It should be noted that third switch means 60 may be remotely positioned from structural member 20 by the use of extension cord 86, shown in broken configuration on FIG. 1. Thus, game mechanism 10 combines a teaching method of word association with participation of the student and teacher.

While in the foregoing specification embodiments of the invention have been set forth in considerable detail for the purposes of making a complete disclosure of the invention, it will be apparent to those of ordinary skill in the art that numerous changes may be made in such details without departing from the spirit and principles of the invention.

What is claimed is:
1. A game mechanism comprising:
   a. first electrically operated alarm means for producing a first signal;
   b. second electrically operated alarm means for producing a second signal;
   c. means for containing an object;
   d. means for displaying a symbolic equivalent of the object in the vicinity of said means for containing an object;
   e. first switch means for activating said first alarm means, said first switch means being electrically connected to said first alarm means;
   f. second switch means for activating said second alarm means; said second switch means being electrically connected to said second alarm means;
   g. third switch means for selectively activating said first and second switch means, said third switch means being electrically connected to said first and second switch means, said third switch means being operable in cooperation with said means for containing an object and said means for displaying a symbolic equivalent of the object;
   h. source of electrical power forming an electrical circuit with said first and second alarm means, and said first, second, and third switch means.

2. The game mechanism of claim 1 in which said first electrically operated alarm means includes a visual alarm operable within first voltage range, and an audio alarm operable within a second voltage range, and said electrical power source is an alternating current source; and further including transformer means for changing the voltage of said electrical power source for selectively operating said visual alarm and said audio alarm.

3. The game mechanism of claim 2 which additionally comprises a structural member for mounting said first and second alarm means, said third switch means; said object containing means, and said display means thereupon.

4. The game mechanism of claim 3 in which said structural member includes a display surface and a fanciful design thereupon and said visual alarm of said first electrically operated alarm means operates in cooperation with said fanciful design.

5. The game mechanism of claim 3 in which said first and second switch means includes a single switch having multiple throw capability.

* * * * *